US012566668B2

(12) United States Patent
Kaki et al.

(10) Patent No.: US 12,566,668 B2
(45) Date of Patent: Mar. 3, 2026

(54) SYSTEM AND METHOD FOR APPLICATION ORCHESTRATION, OBSERVATION, AND FAULT REMEDIATION

(71) Applicant: Rafay Systems, Inc., Sunnyvale, CA (US)

(72) Inventors: Bheema Sarat Chandra Kaki, San Francisco, CA (US); Stephan Benny, Pleasanton, CA (US); Hanumantha Rao Kavuluru, San Jose, CA (US); Haseeb Siddique Budhani, Menlo Park, CA (US)

(73) Assignee: Rafay Systems, Inc., Sunnyvale, CA (US)

( * ) Notice: Subject to any disclaimer, the term of this patent is extended or adjusted under 35 U.S.C. 154(b) by 119 days.

(21) Appl. No.: 18/411,012

(22) Filed: Jan. 11, 2024

(65) Prior Publication Data

US 2024/0232017 A1 Jul. 11, 2024

Related U.S. Application Data

(60) Provisional application No. 63/438,413, filed on Jan. 11, 2023.

(51) Int. Cl.
　　*G06F 11/00* (2006.01)
　　*G06F 11/14* (2006.01)

(52) U.S. Cl.
　　CPC ................................... *G06F 11/14* (2013.01)

(58) Field of Classification Search
　　CPC ............. G06F 11/0793; G06F 11/0709; G06F 11/079; G06F 11/14; G06N 20/00
　　See application file for complete search history.

(56) References Cited

U.S. PATENT DOCUMENTS

| | | | | |
|---|---|---|---|---|
| 9,811,795 B1 * | 11/2017 | Kearns | .................. | G06F 16/355 |
| 10,791,168 B1 | 9/2020 | Dilley et al. | | |
| 11,936,757 B1 | 3/2024 | Benny et al. | | |
| 2019/0065738 A1 * | 2/2019 | Kim | ........................ | G06F 21/57 |
| 2020/0097389 A1 * | 3/2020 | Smith | ................ | G06F 11/0793 |
| 2020/0242493 A1 * | 7/2020 | Botea | ..................... | G06N 20/00 |
| 2020/0311603 A1 * | 10/2020 | Qiu | ..................... | G06F 11/3452 |
| 2021/0027205 A1 * | 1/2021 | Sevakula | ............ | G06F 11/3447 |
| 2021/0264025 A1 * | 8/2021 | Givental | ............... | G06F 18/285 |
| 2021/0303381 A1 * | 9/2021 | Baldassarre | ............. | G06N 5/04 |
| 2023/0052691 A1 * | 2/2023 | Thiruvenkatanathan | .................... G06N 20/20 |

* cited by examiner

*Primary Examiner* — Elmira Mehrmanesh
(74) *Attorney, Agent, or Firm* — MLO, a professional corp.

(57) ABSTRACT

A method to manage a distributed computing machine comprising: configuring a cluster to provide compute and memory resources to run one or more containers that include computer program code to perform operations of the distributed computing machine; configuring one or more cloud-based components to interact with the distributed computing machine; recording in memory storage media, cloud-based component information that indicates events in which the distributed computing machine and the one or more cloud-based components interact; recording in memory storage media, activity metrics information indicating activity level within the distributed computing machine; using the cloud-based component information and the activity metrics information to train one or more machine learning models to represent behavior of the distributed computing machine.

16 Claims, 11 Drawing Sheets

100

101

106

CONTAINER REGISTRY

114

BLOB STORAGE

116

DNS

120

PUB/SUB

118

110

SOURCE CODE REGISTRY

122

DATABASE

124

CACHE

126

102

104

112

108

136

130

APP

134

132

SYSTEM AND METHOD FOR APPLICATION ORCHESTRATION, OBSERVATION, AND FAULT REMEDIATION

CROSS-REFERENCE TO RELATED APPLICATION

This patent application claims the benefit of U.S. Provisional Patent Application No. 63/438,413, filed Jan. 11, 2023, which is incorporated by reference herein in its entirety.

BACKGROUND

Orchestration in computer system administration ordinarily refers to the automated configuration, coordination, and management of applications, computer systems, and services. An orchestration manager computing system often is used to place applications and to provision resources at compute nodes within a computer network. An orchestration manager computing system often is used to track resource usage within a computer network, such as at compute nodes, servers, and/or data centers, and to adjust resource allocation to meet current and expected application and/or system needs. Cloud orchestration typically refers to automated cloud-related tasks, including provisioning and de-provisioning of virtual machines on multiple clouds and/or provisioning storage capacity, for example. Containerized application orchestration ordinarily refers to an automatic process of managing or scheduling the work of individual containers for applications based on microservices within multiple clusters.

An application that operates within a computer network typically can be dependent upon operation of multiple different components of the computer network that act as resources for the application. For example, an application may be dependent upon data at from resources at different locations such as in the Cloud, at different data centers, at a container class registry, and/or at some network manager. In general, each component that an application depends upon must be up and running for an application to operate properly.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Distributed Computing Machine

Figure 1:
FIG. 1 is an illustrative diagram representing an example distributed computing machine.

FIG. 1 is an illustrative diagram representing an example distributed computing machine 100 in accordance with some embodiments. The distributed computing machine 100 is "distributed" in that it includes multiple different computing machines coupled to communicate within a network and configured using computer program code to cooperatively implement operations of the distributed computing machine 100. For economy of presentation, the distributed computing machine 100 shall be referred to hereinafter as the "DCM 100". The DCM 100 includes a user interface application component (an "app") 130 that includes computer program code to configure a device 132 to produce a user interface 134 to provides user access over a network 136 to other distributed components of the DCM 100. The device 130 may include a desktop computer, a vehicle computer, a tablet computer, a navigational device, a portable media device, a smart phone, or a wearable device (e.g., a smart watch, smart glasses, smart clothing) belonging to the user. An example communication networks 136 can include a local area network (LAN), a wide area network (WAN), the Internet, mobile telephone networks, plain old telephone service (POTS) networks, and wireless data networks (e.g., WiFi, LTE, and WiMAX networks).

The DCM 100 includes distributed computing resources 101 that in essence serve as an infrastructure backbone for the DCM 100. More specifically, the DCM 100 includes a cluster 102, cloud-based components 106 and local/on-premises third-party components 110. The application component 130 communicates over the network 136 with the cluster 102 as indicated by arrow 104. The application component 130 communicates over the network 136 with the cloud-based components represented within block 106 as indicated by arrow 108. The application component 130 communicates over the network 136 with the third-party local/on premises components represented box 110 as represented by arrow 112.

The DCM 100 includes containerized resources that include the cluster 102 that comprises a distributed application component. The user interface application component 130 runs at the device. The cluster implements distributed functions of the same application. In other words, the user interface application component 130 and the cluster 102 that implements functions of the application are both components of a distributed application. As explained more fully below with reference to FIG. 7, an example container can include an image that can operate as a ready-to-run software package that can include, program code, a runtime code component required to run the program code, application and system libraries, and default values for certain settings. An example cluster 102 can be in a cloud computing environment (e.g., a geographically distributed set of multiple machines configured to function as a single server) and can include a set of nodes that run containerized computer program code. An example cluster comprises a Kubernetes cluster. In a Kubernetes cluster, the program code runs within Kubernetes pods. A Kubernetes cluster helps to execute the program code within the Kubernetes pods. A node can include a virtual or a physical machine that includes a virtual or a physical processor and a virtual or a physical memory. The DCM 100 is dependent upon further cloud-based compute resources 106 that can include a container registry 114, blob (binary large object) storage 116, a pub/sub (publish/subscribe) messaging service 118, and a DNS (domain name system) 120. The DCM 100 is dependent upon third-party local/on premises compute resources 110 that can include a source code repository 122, a database 124, and a cache 126.

The DCM 100 depends upon nodes of the example cluster 102 to provide compute and memory resources to run one or more containers that include computer program code to perform operations of the application. In some embodiments, cluster 102 can allow containers to run across multiple machines and environments: virtual, physical, cloud-based, and/or local/on-premises. Moreover, an example container can operate on more than one operating systems.

The DCM 100 depends upon compute resources 106 that operate to support performance of the relevant operations in a cloud computing environment in which at least some operations of the DCM 100 may be performed by a group of physical or virtual machines that are accessible via a network (e.g., the Internet) and via one or more appropriate interfaces (e.g., an application program interface (API)). The DCM 100 may depend upon the cloud-based container registry 114 to access one or more container images. The DCM 100 may depend upon the cloud-based blob storage 116 to access binary large objects such as images, audio files, compressed files and/or spreadsheet data. The DCM 100 may depend upon the cloud-based pub/sub service 118 to implement asynchronous messaging. The DCM 100 may depend upon the DNS 120 to translate domain names into IP addresses and to allow other applications on the internet or an intranet discover the application.

The DCM 100 depends upon components that are available locally or on premises. The DCM 100 may depend upon the source code repository 122 to host the application's source code together with metadata. The DCM 100 may depend upon a database 124 to access to persistently stored data. The DCM 100 may depend upon cache storage 126 to save and access transient data.

Configuring the Distributed Computing Machine

Figure 2:
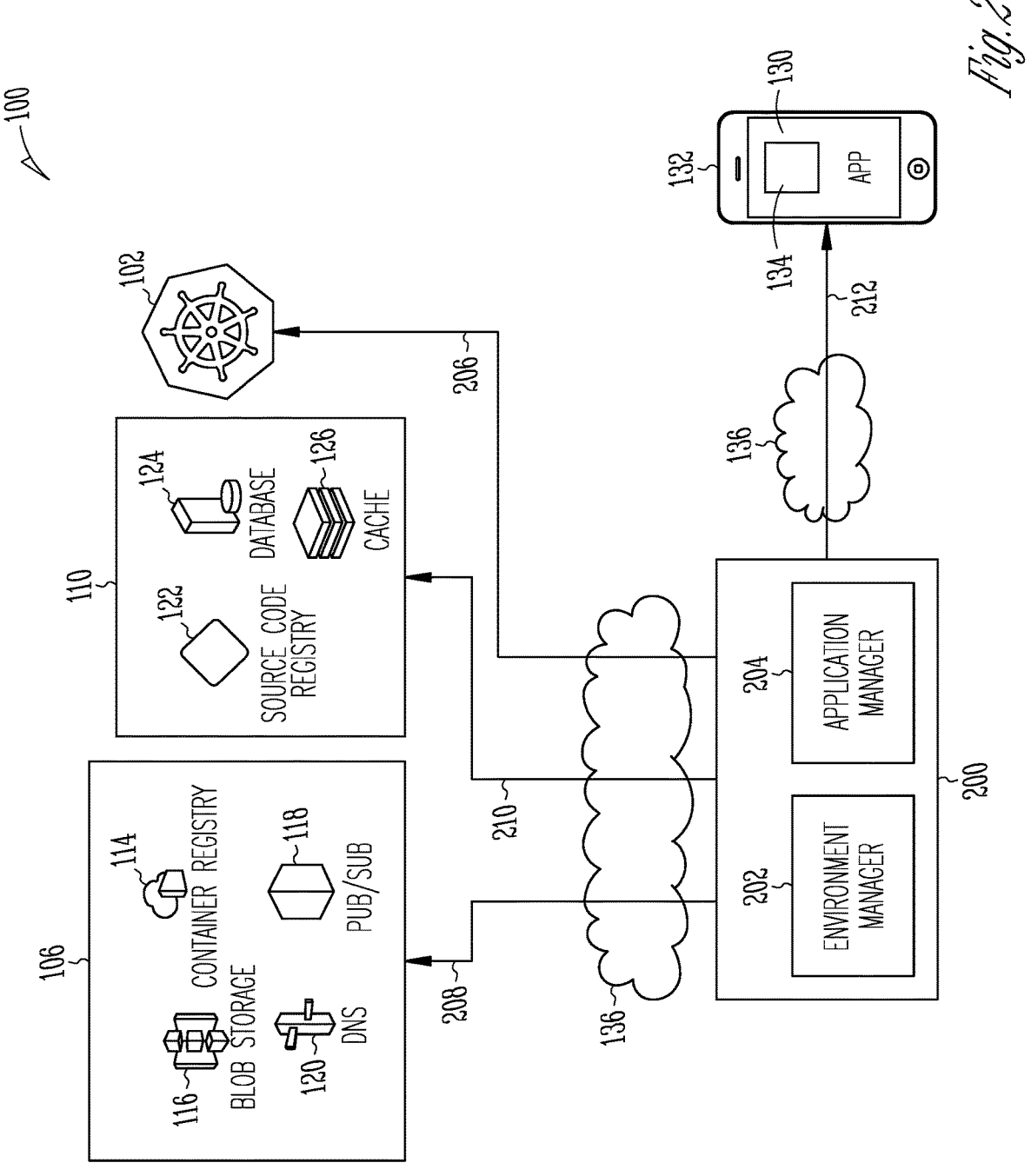
FIG. 2 is an illustrative diagram representing an example orchestration manager configured to orchestrate the distributed computing machine of FIG. 1.

FIG. 2 is an illustrative diagram representing an example orchestration manager 200 configured to orchestrate the DCM 100 of FIG. 1. An example orchestration manager 200 includes an application orchestration manager 204 and a computing environment manager 202. The application orchestration manager 204 manages the lifecycle of the cluster 102. An example computing environment manager 202 manages the lifecycle of the cloud computing resources

106 and the local/on-premises computing resources 110. A computing environment manager 202 also may provision dedicated resources from the environment that are required for an example application 100 running in the computing environment.

As represented by arrow 206, the example application orchestration manager 204 communicates over the network 136 to configure a cluster 102, which may be operative in the cloud computing environment. More particularly, the application orchestration manager 204 can build computer code components of the DCM 100 that can span multiple containers, schedule containers across a cluster, scale the containers, and manage their health over time. The application orchestration manager 204 can assign storage capacity, assign processor compute resources, create virtual machines, and manage networking required to implement the application 100. Commonly owned U.S. Pat. No. 10,791, 168, entitled Traffic Aware Network Management System, which is expressly incorporated herein in its entirety by this reference, discloses an example embodiment of the application orchestration manager 204. The application orchestration manager 204 also communicates over the network 136 to configure communication between the cluster 102 and the application 130 running on the device to communicate.

As represented by arrow 208, the computing environment manager 202 can configure one or more cloud-based computing resources 106 to interact with the application 100 and to configure the application 100 to interact with the cloud-based computing resources 106. Interaction between the application 100 and the one or more cloud-based components 106 can involve the application accessing and using information provided by the cloud-based components 106. As represented by arrow 210, the computing environment manager 202 can configure one or more local/on-premises third-party components 108 to interact with the application 100 and to configure the application 100 to interact with the one or more local/on-premises third-party components 110. Interaction between the application 100 and the one or more third-party components 110 can involve the application accessing and using information provided by the local third-party components 110. As represented by arrow 212, the orchestration manager 200 can communicate over the network 136 with the application 100 to inject computing environment information, such as interface information and access information, into the application 100 at orchestration time. The example orchestration manager 200 also monitors, coordinates, and manages interactions among the various components of the application 100 e.g., cluster 102, cloud-based computing resources 106, and local/on premises computing resources 110.

The orchestration manager 200 manages the life cycle and performance of the application 100. Proper operation of the application requires that the application's components provide the services and/or operations that the application depends upon. Cloud-based components 106 often exhibit more dynamic changes than local/on-premises third-party components 110, which often are more static. Arrow 206 further represents the application orchestration manager 204 managing the life cycle of the cluster 102 used to implement the example application 100. Arrows 208, 210 respectively represent the computing environment manager 202 managing the example application's access and use of cloud-based components 106 and the example application's access and use of local/on premises third-party components 110 that the application 100 depends upon. In some embodiments, cloud resources 106 may be managed by a third-party cloud provider. Whereas the computing environment manager 202 may manage provisioning of local/on-premises third-party resources 110.

Recording Event and Trace Information

Figure 3:
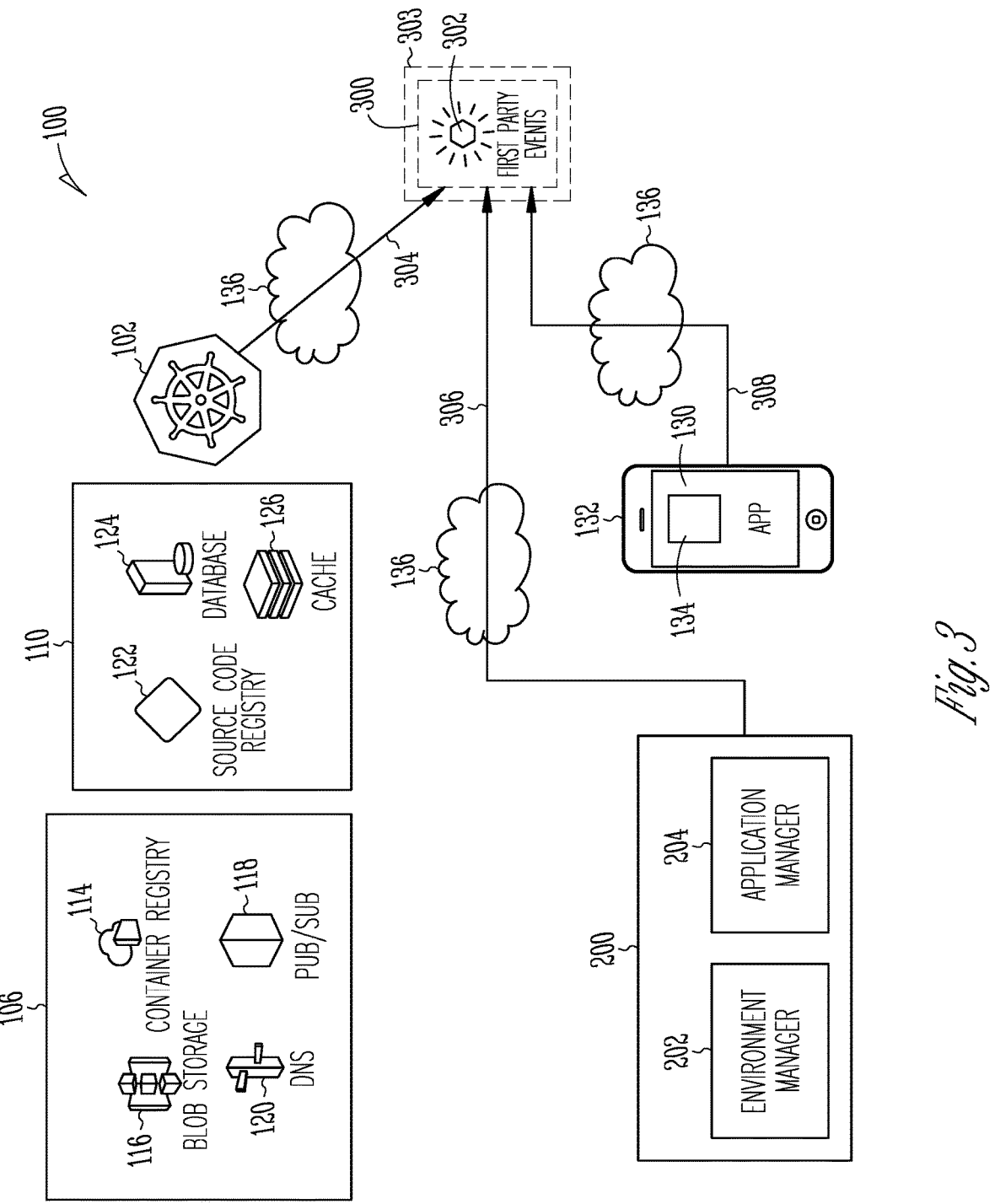
FIG. 3 is an illustrative diagram representing recording of first party event information of the distributed computing machine of FIG. 1.

FIG. 3 is an illustrative diagram representing recording of first party event information 302 at first party events memory storage media 300. The first party information may include streaming of first party logs or first party events. As used herein, the term "first party" refers to the application 130, the cluster 102, and the application orchestration manager 204. As used herein a "first party information" refers to information emitted by one or more of the user interface application component 130, the cluster 102, and the application orchestration manager 204. As explained above, the example DCM 100 is containerized such that certain DCM functionality is implemented using an example cluster 102. The application orchestration manager 204 may be used to cause launch of one or more first party agents (e.g., that configure a computing machine to execute computer software code) to monitor and collect first party information and to save the first party information at memory storage media 300 operative at a computing machine 303 accessible over the network 136. Alternatively, one or interfaces can be used to monitor and collect first party information and to save the first party information at memory storage media 300. An application can be instrumented to track and report events. As used herein an "event" includes an action or occurrence in a computing system that can be recognized by computer software running on the computing system. The application orchestration manager 204 can use software-based agents running at the application 100, or can use an interface, to track and record occurrences and metrics of first party events. Arrow 304 represents using one or more agents or an interface to track and record events occurring at an example cluster 102. Arrow 306 represents using one or more agents or an interface to track and record events occurring at the application orchestration manager 204. Arrow 308 represents tracking and recording events occurring at the example user interface application component 130. More particularly, for example, first party events emitted at 304 by an agent running on a Kubernetes cluster, for example, can include activities indicating application dependencies, changes to an application or its dependencies, metrics and traces emitted from application containers, runtime network interaction traces from components of the application 100. First party events emitted at 306 by the application orchestration manager 200 include events that occur in the context of an application's orchestration, for example. First party events emitted by the user interface application component 130 include traces/telemetry data exported by the user interface application component 130, for example. Tracking and recording first party events is important to application lifecycle management. For example, tracked events at can include application program code deployment, application program code destroyed, application program code updated, portions of the cluster 102 updated, portions of the cluster 102 being destroyed, addition of resources to the cluster 102. Portions of the distributed computing environment 101 may be provisioned based upon occurrences at the user interface application component 130, cluster 102, or application orchestration manager 204, for example.

Figure 4:
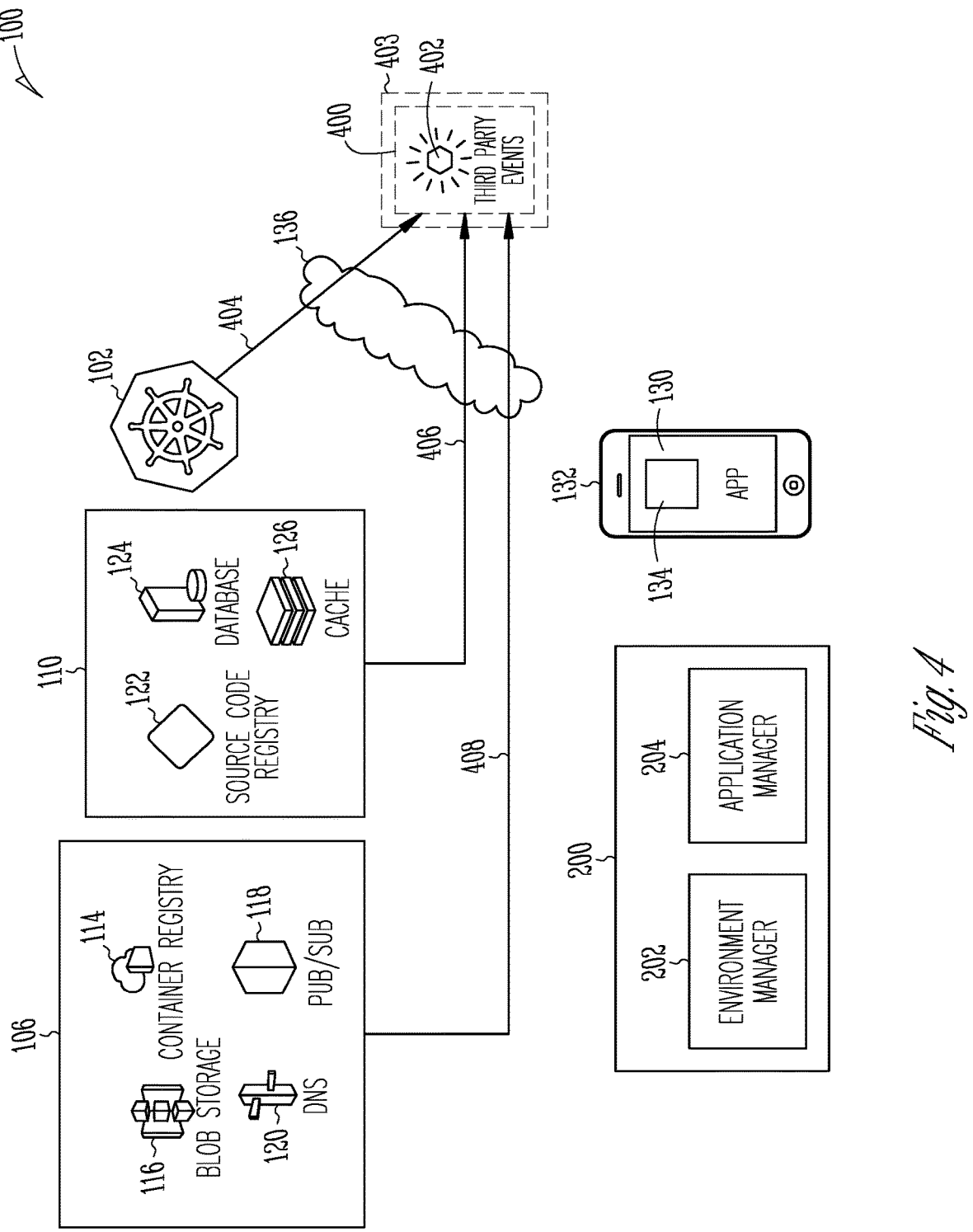
FIG. 4 is an illustrative diagram representing recording of third-party event information of the distributed computing machine of FIG. 1.

FIG. 4 is an illustrative diagram representing recording of third-party event information 402 at third party events memory storage media 400. The third-party event information may include streaming of third-party logs or third-party events. As used herein, the term "third-party" refers to the cloud components 106, local/on-premises components 110, and certain cluster components 102. The third-party information indicates which third party components are running and what the components are doing. Arrow 404 represents cluster level events exported over the network 136 by third-party components such as monitoring and debugging software and/or cloud monitoring and security software to the memory storage media 400, which is operative at a computing machine 403 and which is accessible over the network 136. Arrow 406 represents node level or service level events exported over the network 136 by local/on-premises third-party component to the memory storage media 400. Such third-party components may have one or more agents running to collect data that can provide information such as whether the resources allocated to the DCM 100 are being overutilized or underutilized, for example. Such usage information can be used to update provisioning of third-party resources for the DCM 100, for example. Arrow 408 represents cloud provider specific events emitted by a cloud provider or by other third parties about a cloud provider that are exported over the network 136 to the memory storage media 400.

Figure 5:
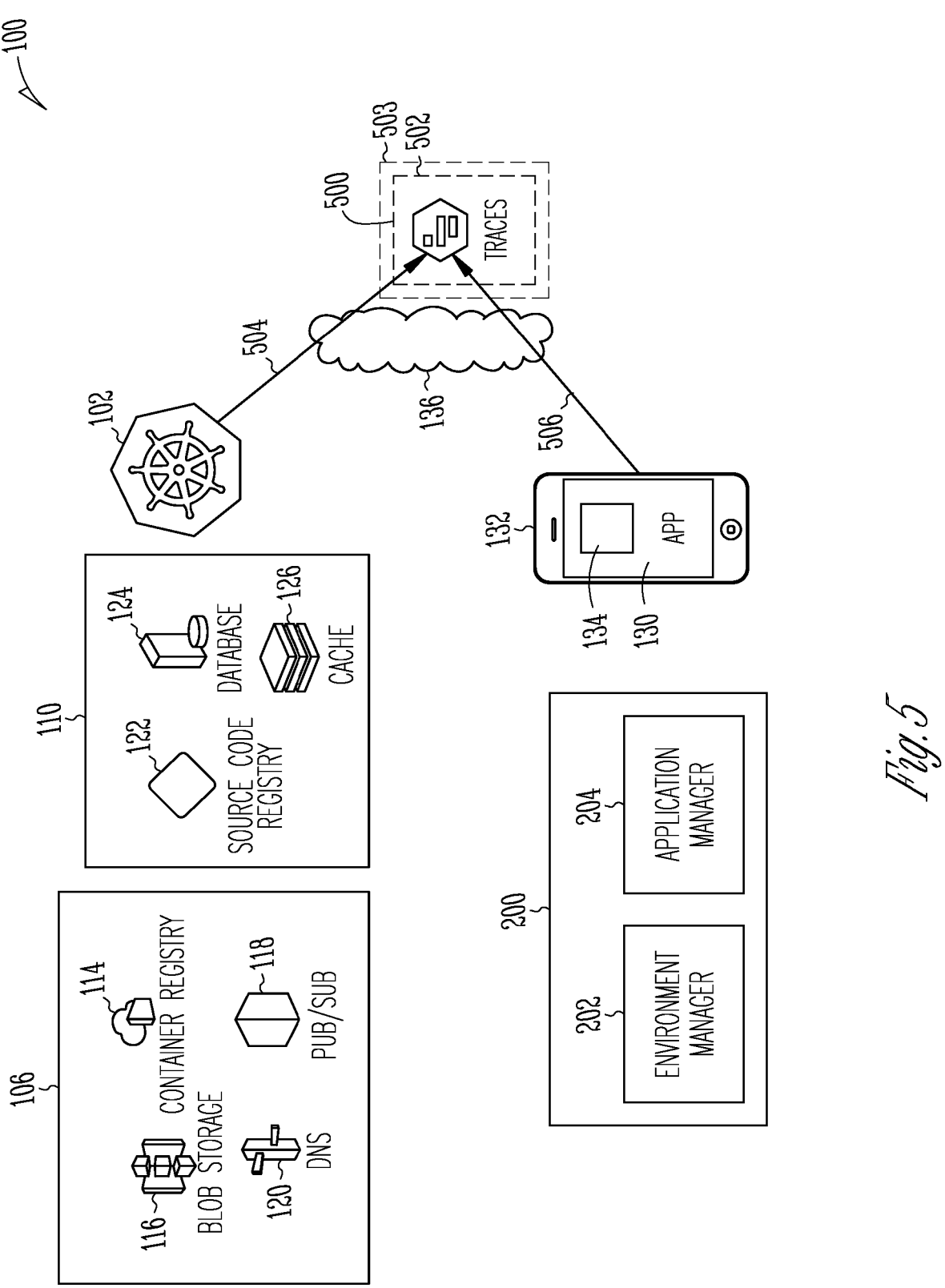
FIG. 5 is an illustrative diagram representing recording traces of activity metrics information of the distributed computing machine of FIG. 1.

FIG. 5 is an illustrative diagram representing recording of activity metrics 502 at trace memory storage media 500. A trace indicates, from computer program point of view, how communication is happening. For example, when multiple computer program components run, they operate cooperatively, and to cooperate, the components need to communicate. A trace records indicia of the communications. For example, a service A may have to cooperate with a service B. A trace collects these communications. An application component 130 can be configured through tracing instrumentation (e.g. an OpenTelemetry program) or through operation with an external tracing program (e.g., an eBPF program) to collect and export runtime execution traces to the trace memory storage media 500 operative at a computing machine 503 accessible over the network 136. Also, for example, Kubernetes may provide trace information at cluster 102. Kubernetes may run traces natively. For instance, as explained above, the DCM 100 may include functions that are implemented using code that runs on a Kubernetes cluster 102 and Kubernetes may be monitoring communications among pods that contain application code. An agent may be run on Kubernetes to collect the trace information gathered by Kubernetes and to automatically export traces over the network 136 to the trace memory storage media 500. Moreover, activity traces can include execution traces that indicate information such as one or more profiles of processor usage level and/or one or more profiles of memory usage level at one or more nodes of the cluster 102. The traces can include network traces that indicate information such as one or more profiles of network activity level such as number and frequency of connections and data transfer volumes at one or more nodes of the cluster 102. Arrow 504 represents application network traces received over the network 136 from a Kubernetes cluster 102. Arrow 506 represents application execution traces received from components of an instrumented application component 100 running at the device 130.

Fault Detection and Remediation

Figure 6:
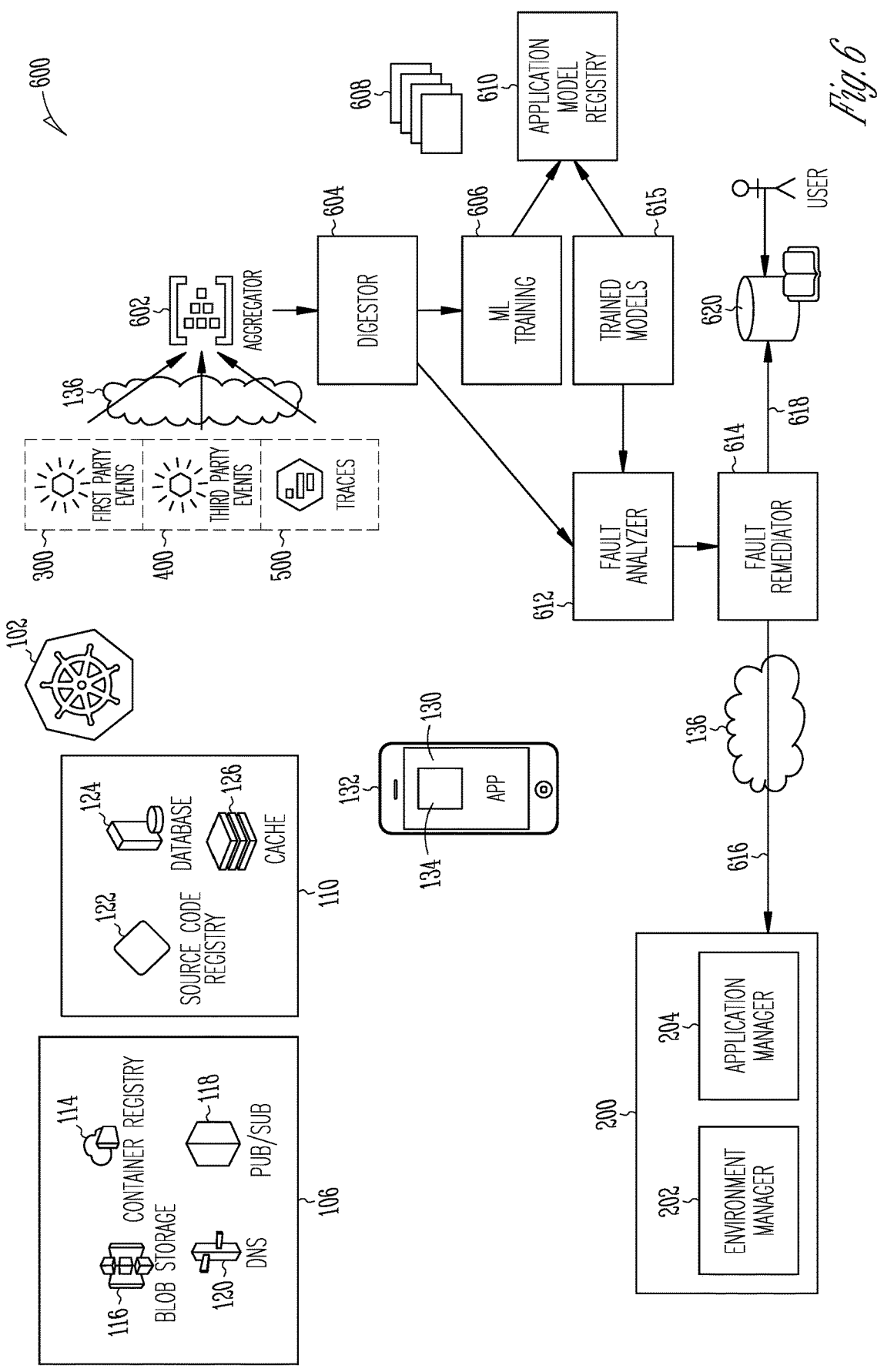
FIG. 6 is an illustrative drawing that includes a flow diagram that represents a process to identify and remediate faults in operation of the distributed computing machine of FIG. 1 in accordance with some embodiments

FIG. 6 is an illustrative drawing that includes a flow diagram that represents a process 600 to identify and remediate faults in operation of the example application 100. The process 600 is implemented using one or more computing machines programmed with executable instructions to perform the following operations. An aggregation operation 602 ingests first party information 302, third party information 402 and trace information 502 from the respective memory storage media 300, 400, and 500. The aggregator 602 can natively ingest events, traces, and metrics from various components. An example event aggregator 602 communication between different parts of the DCM 100 to allow components to publish events when certain actions occur and allows other components to subscribe to events of interest. The aggregator 602 routes events to the appropriate subscribers, enabling asynchronous communication and enhancing system modularity and flexibility.

An event digester operation 604 receives diverse data or events from various sources, standardizes their format, validates their correctness, and may add extra information. It ensures uniformity and consistency in the data, making it easier to work with and integrate into systems. This digester operation simplifies data processing, enhances data quality, and facilitates interoperability between different data sources and systems. More particularly, an example digester operation 604 normalizes the aggregated information to produce digest information that includes the aggregated information in a normalized format suitable for use in model training. An example digester operation 604 normalizes ingested events/metrics and finds correlations between independent event streams. A digester operation 604 can determine dependencies between an application 100 and components of the environment 101 based upon event information and trace information. For example, dependency between an application 100 and one or more components in the environment 101 may be determined based upon event information that indicates variables accessed from the one or more components of the environment during updating of the application. Moreover, for example, correlations between an application 100 and one or more components of the environment 101 may be determined based upon trace information that indicates communications between the application 100 and the one or more components of the environment 101. Furthermore, for example, an example digester operation can identify on a timeline; a git commit which has caused some pods to go into crash loop, which in turn is affecting some other services. Also, for example, when a service is deleted an example digester 604 can identify all the resources which are directly and indirectly affected by the deletion. An example digester operation 604 can receive user supplied hints/groupings for correlations. Users can supply manifests which group all related components. These hints can be used for deriving additional correlations on top of the automatic correlations. The digest information may be provided as samples or stream of information during execution of the application 100.

A machine learning model training operation 606 uses the digested information as training data to train different machine learning models 608. The one or more trained models 608 includes a respective baseline model that represents normal behavior of a corresponding application under baseline conditions. For example, each of the trained models 608 may indicate that under certain conditions, a corresponding DCM 100 should be behaving/executing in a certain manner such as communicating certain third-party components. Alternatively, for example, each of the trained models 608 may indicate that under certain conditions a corresponding DCM 100 should exhibit CPU usage within some range, memory usage within some range, and network communication activity within some range. The one or more trained models also include one or more models trained to identify fault conditions of the DCM 100.

Operation 610 provides an application model registry to store the trained models 608. An example machine learning model registry helps manage machine learning models throughout their lifecycle. It allows registration of models, version control of them, store associated metadata and documentation, and control access. It maintains can multiple versions of the machine learning trained models. The registry streamlines model management, collaboration, and deployment, facilitating efficient model lifecycle management in production environments.

A fault analyzer operation 612 determines whether an application fault has occurred based upon digest information produced using the digester 604 and one or more of the trained models 608 and identifies a likely source of a fault when one occurs. Operation 614 represents accessing one or more trained models 608 from the application model registry 610 for use in evaluating whether the DCM 100 exhibits fault behavior. The fault analyzer 612 uses the one or more trained models 608 to determine whether behavior of the DCM 100 conforms to behavior predicted by the one or more trained models 608. A DCM 100 whose digest information indicates that the DCM is not behaving as expected based upon the one or more trained models is determined to have suffered a fault. More particularly, an example fault analyzer 612 determines whether the DCM 100 deviates from operation predicted by a corresponding trained model by more than a threshold amount and declares a fault if such deviation is detected. An example fault analyzer 612 also can identify possible sources or causes of a fault experienced by the application 100 based upon portions of digest information that deviate from expected normal DCM behavior according to the one or more trained models 608.

Fault remediator operation 615 determines a proposed remediation for an identified fault. For example, some faults that follow a known pattern, can be remediated by following a known sequence of steps. A sequence of steps sometimes is referred to as a script or a playbook. Application providers can supply custom playbook to run under certain conditions. As represented by arrow 616, the fault remediator operation 614 can report the proposed remediation to the orchestration manager 200. An example fault remediator operation 614 can trigger/alert external systems in response to a sequence of events. For example, when in response to a determination that a database CPU is spiking, the fault remediator 614 can cause launch of tracing tools which use eBPF (extended Berkeley Packet Format) to capture ongoing database queries from Kubernetes pods which may be talking to the particular database. The orchestration manager 200 then can take the recommended steps to remediate the fault. As represented by arrow 618, the fault remediator operation 618 can report the proposed remediation to a user interface 620. A user can access the user interface 620 take steps to remediate the fault. For example, a user may run one or more scriptable playbooks to interact with external systems in response to triggers/alerts.

An example fault remediator operation 614 provides fault remediation runbooks which can include an associative map of labels against actions. Fault remediation runbooks can be automatically generated or can be user supplied. When an event identified using a digester operation 604 is identified as a fault by the fault analyzer 612 using a machine learning trained model 608, the model produces a set of one or more labels and an associated confidence (probability of it being that label). When the confidence of a label exceeds a threshold, a playbook(s) associated with the label in the context of the DCM 100 is played through at least one of the application manager 204 or the environment manager 202 to remediate the fault. More particularly, the application manager 204 can be used to adjust operation of the application component 130 and/or the cluster 102 to remediate a fault identified as arising based at least in part upon operation of one or the other or both of them. Similarly, the environment manager 202 can be used to adjust operations of one or more of cloud-based components 106 and/or one or more of local/on-premises third-party components 110 to remediate a fault identified as arising based upon one or more of their operations. Users are also notified of the application faults and the remediation action that is being taken. This process is continued until the events become normal.

Cluster Example

Figure 7:
FIG. 7 is an illustrative drawing showing an example node of a Kubernetes cluster. Cluster may include a Kubernetes cluster, which comprises a collection of nodes on which workloads can run in accordance with some embodiments.

FIG. 7 is an illustrative drawing showing an example node of a Kubernetes cluster. Cluster 102 may include a Kubernetes cluster, which comprises a collection of nodes on which workloads can run. A Kubernetes cluster consists of nodes and a control plane. The control plane architecture 704 is composed of an API server 712, a scheduler 714, a controller 716, and a key-value store called etcd 718. An example container 730 comprises a private network and a virtual file system that runs on a host node and that is not shared with other containers or the host node. An example container 730 includes a container image 732 and a container runtime 734. An example container image 732 includes computer program code, libraries, tools, dependencies, and other files used to enable an application program to run. An example container runtime 734 comprises computer program code to run the application code defined in the container image 732. A container runtime is the container-execution framework that can run containers. A container runtime 734 is used to execute the container image 732. The container 730 runs on an operating system of a node 706 within a pod 736. A pod is a mechanism Kubernetes uses to group containers. A pod can have one or more containers. Additional details of an example implementation of a cluster 102 are provided in commonly owned co-pending U.S. patent application Ser. No. 17/740,348, entitled Pull-Based On-Demand Application Deployment to Edge Node, which is expressly incorporated herein in its entirety by this reference.

Digester Operation

Figure 8:
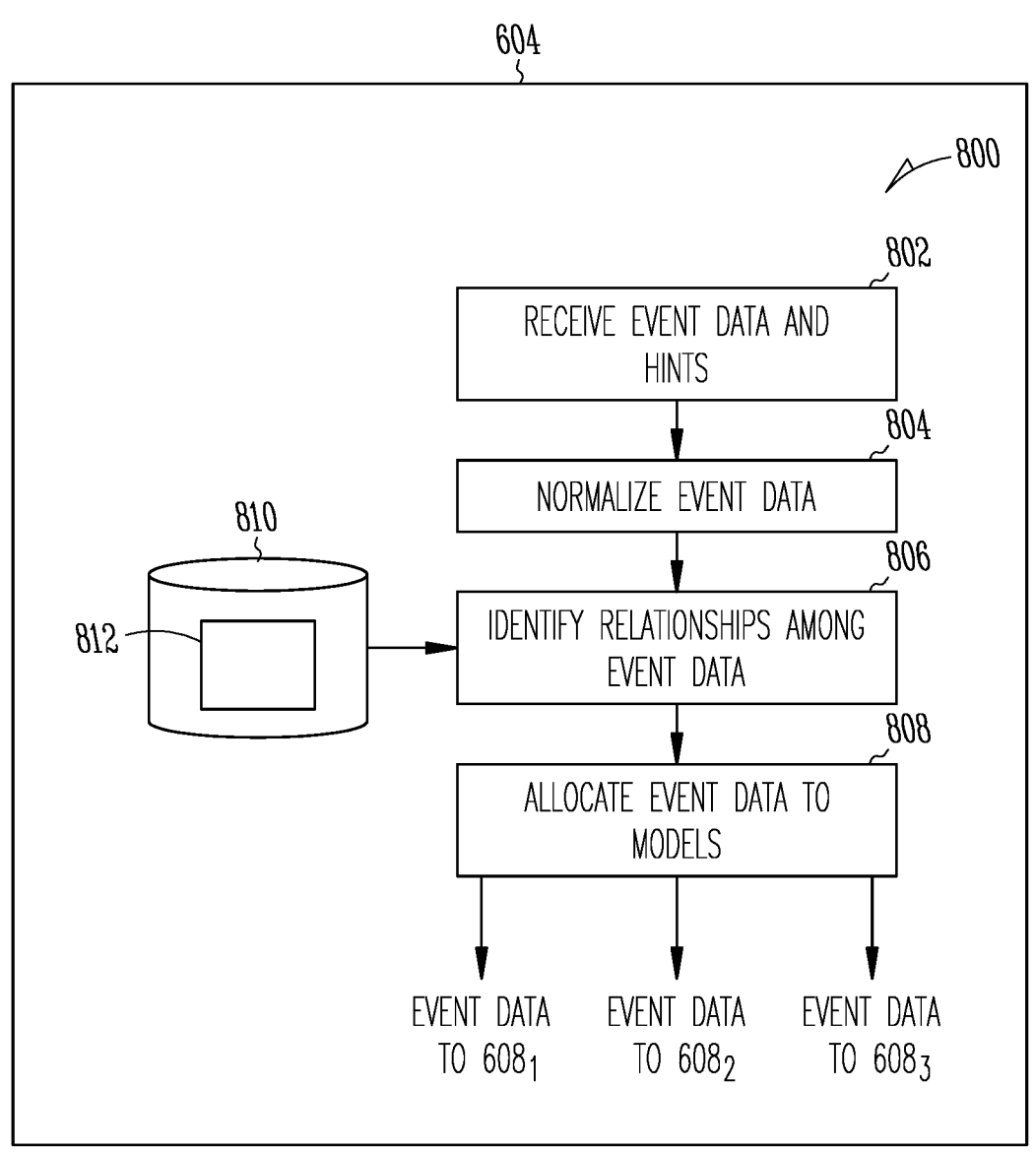
FIG. 8 is an illustrative flow diagram representing an event digest process of the digester operation in accordance with some embodiments.

FIG. 8 is an illustrative flow diagram representing an event digest process 800 of the digester operation 604. The digester process 800 is implemented using one or more computing machines programmed with executable instructions to perform the following operations. Operation 802 receives event data and trace data from the aggregator operation 602 and may receive hints provided by users. Operation 804 normalizes the event data. Operation 806 identifies relationships among the event data. Operation 808 allocates event data to machine learning ML models.

Normalizing to a same format facilitates consistent storage and processing of events in a consistent manner. An example normalizing operation 804 normalizes the received event data to a cloud event data format, which has the additional advantage of making the normalized data easier to export.

Table 1 sets forth illustrative example trace data that can be received using operation 820. An application trace can be useful in training RNN/LSTM type models.

TABLE 1

```
{
    "name": "/v1/sys/health",
    "context": {
        "trace_id": "7bba9f33312b3dbb8b2c2c62bb7abe2d",
```

TABLE 1-continued

```
        "span_id": "086e83747d0e381e"
    },
    "parent_id": "",
    "start_time": "2021-10-22 16:04:01.209458162 +0000 UTC",
    "end_time": "2021-10-22 16:04:01.209514132 +0000 UTC",
    "status_code": "STATUS_CODE_OK",
    "status_message": "",
    "attributes": {
        "net.transport": "IP.TCP",
        "net.peer.ip": "172.17.0.1",
        "net.peer.port": "51820",
        "net.host.ip": "10.177.2.152",
        "net.host.port": "26040",
        "http.method": "GET",
        "http.target": "/v1/sys/health",
        "http.server_name": "mortar-gateway",
        "http.route": "/v1/sys/health",
        "http.user_agent": "Consul Health Check",
        "http.scheme": "http",
        "http.host": "10.177.2.152:26040",
        "http.flavor": "1.1"
    },
    "events": [
        {
            "name": "",
            "message": "OK",
            "timestamp": "2021-10-22 16:04:01.209512872 +0000 UTC"
        }
    ]
}
this is an example application trace
this kind of data is useful for training RNN/LSTM type models
```

Table 2A sets forth illustrative example first event data that can be received at operation 802. This example second event would be generated when a Kubernetes cluster is created.

TABLE 2A

```
{
    "event_id": "123456789",
    "timestamp": "2024-01-15T15:30:00Z",
    "event_type": "ClusterCreated",
    "cluster_name": "my-eks-cluster",
    "region": "us-east-1",
    "created_by": "user123",
    "details": {
        "environment_id": "env-234234"
        "cluster_id": "cluster-abcdef123456",
        "node_count": 3,
        "instance_type": "m5.large",
        "creation_time": "2024-01-15T15:30:00Z",
        "subnet_ids": ["subnet-12345678", "subnet-87654321"],
        "security_group_ids": ["sg-abcdef12", "sg-56789abc"]
    }
}
This event would be generated when a Kubernetes cluster is created.
```

Table 2B sets forth illustrative example normalized version of the first event data, normalized using the normalizing operation 804.

TABLE 2B

```
{
    "id": "123456789",
    "source": "/your-app/eks-events",
    "specversion": "1.0",
    "type": "com.example.ClusterCreated",
    "datacontenttype": "application/json",
    "time": "2024-01-15T15:30:00Z",
    "data": {
        "event_id": "123456789",
        "timestamp": "2024-01-15T15:30:00Z",
        "event_type": "ClusterCreated",
```

TABLE 2B-continued

```
    "cluster_name": "my-eks-cluster",
    "region": "us-east-1",
    "created_by": "user123",
    "details": {
        "cluster_id": "cluster-abcdef123456",
        "node_count": 3,
        "instance_type": "m5.large",
        "creation_time": "2024-01-15T15:30:00Z",
        "subnet_ids": ["subnet-12345678", "subnet-87654321"],
        "security_group_ids": ["sg-abcdef12", "sg-56789abc"]
        }
    }
}
```

Table 3A sets forth illustrative example second event data that can be received using operation 802. The example second event data would be generated when a workload (of type HELM) is deployed on to the cluster.

TABLE 3A

```
{
    "event_id": "987654321",
    "timestamp": "2024-01-16T10:45:00Z",
    "event_type": "HelmChartDeployed",
    "cluster_name": "my-eks-cluster",
    "release_name": "my-app-release",
    "chart_name": "my-app-chart",
    "chart_version": "1.2.3",
    "namespace": "default",
    "deployed_by": "user123",
    "details": {
        "environment_id": "env-234234",
        "cluser_id": "cluster-abcdef123456",
        "deployment_time": "2024-01-16T10:45:00Z",
        "chart_values": {
            "replicaCount": 3,
            "image": "my-app-image:v1.0.0",
            "port": 8080
        }
    }
}
This event would be generated when a workload (of type HELM) is
deployed on to the cluster.
```

Table 3B sets forth illustrative example normalized version of the second event data, normalized using normalizing operation 804.

TABLE 3B

```
{
    "id": "987654321",
    "source": "/your-app/helm-chart-events",
    "specversion": "1.0",
    "type": "com.example.HelmChartDeployed",
    "datacontenttype": "application/json",
    "time": "2024-01-16T10:45:00Z",
    "data": {
        "event_id": "987654321",
        "timestamp": "2024-01-16T10:45:00Z",
        "event_type": "HelmChartDeployed",
        "cluster_name": "my-eks-cluster",
        "release_name": "my-app-release",
        "chart_name": "my-app-chart",
        "chart_version": "1.2.3",
        "namespace": "default",
        "deployed_by": "user123",
        "details": {
            "deployment_time": "2024-01-16T10:45:00Z",
            "chart_values": {
                "replicaCount": 3,
                "image": "my-app-image:v1.0.0",
                "port": 8080
            }
        }
    }
}
```

TABLE 3B-continued

```
    }
}
```

Table 4 sets forth illustrative example third event data that can be received using the receive operation 802. The example third event data would be generated when a Database is created.

TABLE 4

```
{
    "event_id": "789012345",
    "timestamp": "2024-01-17T14:15:00Z",
    "event_type": "RDSInstanceCreated",
    "instance_name": "my-db-instance",
    "region": "us-west-2",
    "created_by": "user456",
    "details": {
        "environment_id": "env-234234",
        "instance_id": "db-abcdef123456",
        "db_engine": "MySQL",
        "db_engine_version": "8.0",
        "allocated_storage_gb": 100,
        "db_instance_class": "db.t2.medium",
        "multi_az": false,
        "availability_zone": "us-west-2a",
        "vpc_id": "vpc-7890abcd",
        "security_group_ids": ["sg-xyz12345"],
        "subnet_group": "my-db-subnet-group"
    }
}
This would be generated when a Database is created.
----
All these events belong to the same environment.
---
The relationship data from each event is used to train GNN type models.
```

Operation 806 can access non-transitory storage media 810 that stores relationship information 812 that indicates relationships among resource/type and resources in events, for example, that are related to each other either directly or indirectly. In some embodiments, the relationship information 812 is stored in a database. It is noted that the first, second, and third event data in Tables 2A, 3A, and 4 contain data that indicate their relatedness in that each of these event data identify the same environment i.e., "environment_id": "env-234234". Therefore, operation 606 can use the first, second and third event data to determine that Cluster (Table 2A), Workload (Table 3A) and Database (Table 4) are part of the same environment, and therefore, related to one another. The workload is deployed onto the cluster. Hence, it can be inferred that the database is indirectly related to the workload and the cluster is directly related to the workload. Further the node(s) that the workload is running in the cluster are known and therefore, can be related to the Cluster, Workload, and Database. The relationship information can be dynamically updated as new events are received. The relatedness information is useful in fault remediation. For example, if the availability zone the database is deployed onto is experiencing issues then it can be derived that a workload related to the database also might have issues.

User-supplied hints can be used to indicate relationships and/or dependencies between resources that are part of an environment used by a DCM 100 and a resource (e.g., a database) that is not part of the environment, for example. There can be resources outside of the environment that the DCM 100 depends on. When a DCM 100 depends on these resources that are outside the environment used by a DCM 100, operation 806 cannot infer that the DCM 100 has a dependency on a resource. However, in accordance with some embodiments, a user with knowledge of the relationship can manually annotate the event data to make the outside resources a part of the environment of the DCM 100, so that operation 806 can infer the dependency.

Figure 9:
FIG. 9 is an illustrative drawing representing additional details of the machine learning model training operation in accordance with some embodiments.
Figure 9:
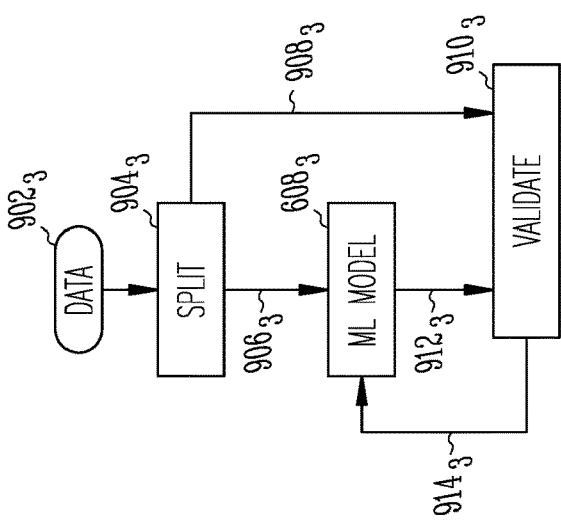
Figure 9:
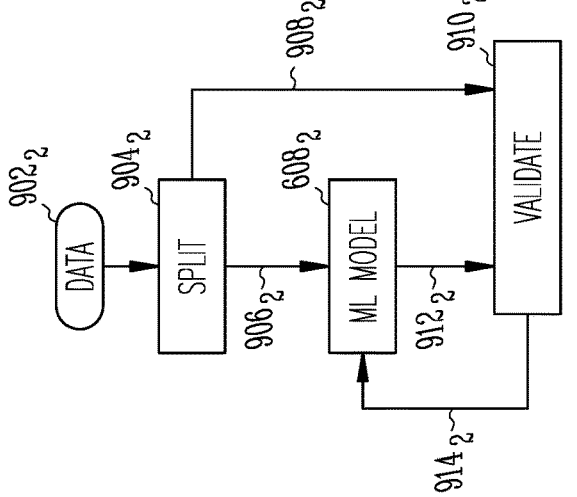
Figure 9:
Figure 9:
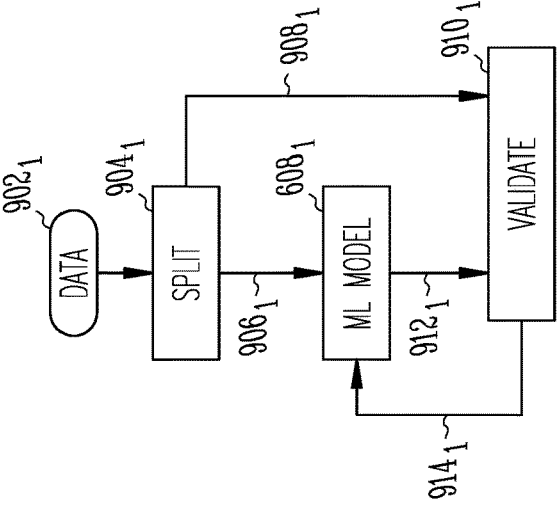

In an example embodiment, operation 808 allocates event data to ML models 608 for training and for use operational use. Different ML models 608 may be trained with different event data to detect different faults. Operation 808 uses type and other parameters within event data to allocate event data to ML models 608. In an example embodiment, one or more ML models are trained using an RNN/LSTM algorithm to capture dependencies over time and can be used for tasks such as anomaly detection, predicting service response times, and understanding the temporal behavior of applications. An example first ML model $608_1$ trained with an Recurrent Neural Network (RNN)/Long Short-Term memory (LSTM) using time series metric/tracing data such as that shown in Table 1. Accordingly, the allocation operation 808 would allocate time series metric/tracing data of Table 1 to the example first model $608_1$. In an example embodiment, one or more ML models are trained using a GNN (Graph Neural Network) to capture dependencies and interactions within an DCM's architecture, which is particularly useful for understanding the behavior of distributed systems. An example second ML model $608_2$ trained with a GNN using relationship information can be trained with the event data shown in each of Tables 2B, 3B, and a normalized version of the event data of Table 4. Accordingly, the allocation operation 808 would allocate first, second, and third event data of Tables 2B, 3B, and a normalized version of the event data of Table 4 to the example second model $608_2$. In an example embodiment, one or more ML models are trained using a clustering algorithm such as K-Means or DBSCAN to group similar traces together to help identify common usage patterns or performance bottlenecks within a DCM 100. Clustering algorithms can be used for monitoring the performance of various application components/dependencies. Events related to response times, latency, or error rates can be clustered to identify performance bottlenecks or degradation. An example third ML model $608_3$ trained with K-Means or DBSCAN using suitable event data.
ML Training FIG. 9 is an illustrative drawing representing additional details of the machine learning model training operation 606 in accordance with some embodiments. The machine learning training process 606 is implemented using one or more computing machines programmed with executable instructions to perform the following operations. For economy of disclosure, only three ML models $608_1$, $608_2$, and $608_3$ are shown. However, it will appreciated that a larger number of ML models may be trained. As explained above, different ML models may be trained using different event data and/r trace data. In an example model training operation 606, one or more ML models are trained to detect normal baseline DCM performance and to output one or more classification labels and a confidence score in response to receiving event and/or trace data indicative of normal baseline performance. In addition, one or more models are trained to detect DCM fault conditions and to output one or more classification labels and a corresponding confidence score in response to receiving event data and/or trace data indicative of a fault. Different ML models can be trained to detect different DCM fault conditions.

Figure 10:
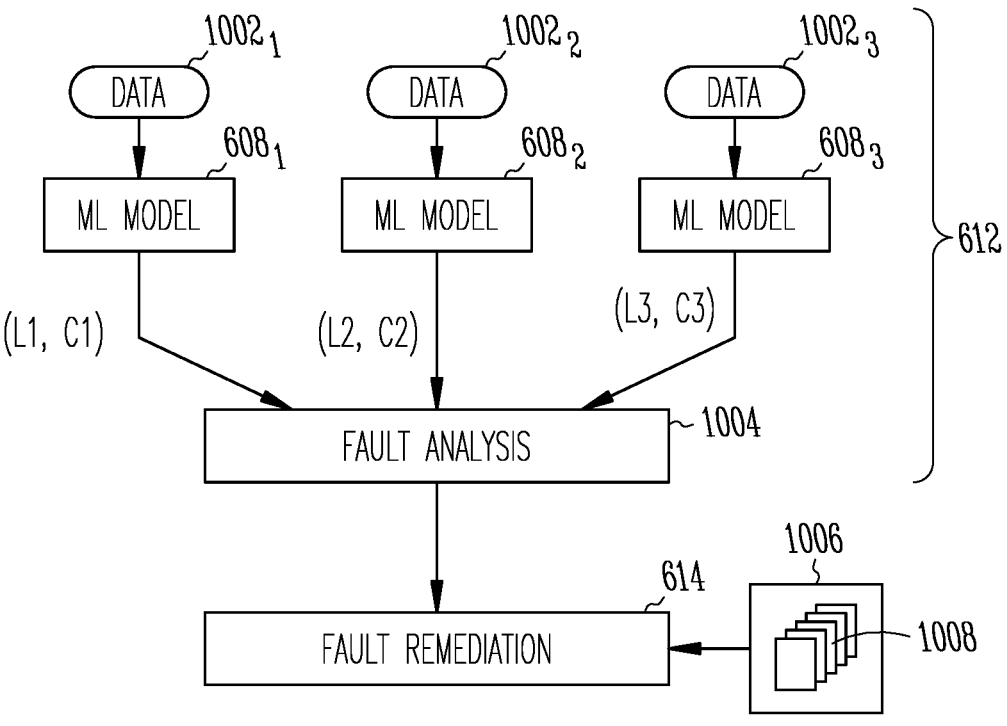
FIG. 10 is an illustrative drawing representing additional details of the fault detection operation and fault remediation operation in accordance with some embodiments.

To train the first ML model $608_1$, first training data $902_1$ comprising event data and/or trace data is received at a split operation $904_1$. The split operation $904_1$ splits the first training data $902_1$ into a first data portion $906_1$ and a second data portion $908_1$. The first data portion $906_1$ is used to train the first ML model $608_1$. The second data portion $908_1$ is used to validate training of the first ML model $608_1$. In an example machine learning model training operation 606, first data portion $906_1$ includes eighty percent of the received first training data $902_1$ and the second data portion $908_1$ includes the remaining twenty percent of the received first training data $902_1$. During a validation phase of training, the validation operation $910_1$ receives the second data portion $908_1$ and output $912_1$ from the ML model $608_1$ in response to the second portion second data portion $908_1$ and computes validation metrics for the training of the first ML model $608_1$ such as accuracy, precision, recall, F1-score, mean squared error, etc., to measure how well the first ML model $608_1$ is doing in evaluating the second portion data $908_1$ that it has not seen during training. The validation operation $910_1$ provides feedback $914_1$ to the ML model to adjust and improve training. The validation operation $910_1$ determinations help in monitoring the training progress of the first ML model $608_1$ progress and can be used in making decisions like early stopping (if performance on the validation set starts to degrade, for example). The example second and third ML models $608_2$, $608_3$ are similarly trained and validated as shown.
Fault Detection and Fault Remediation FIG. 10 is an illustrative drawing representing additional details of the fault detection operation 612 and fault remediation operation 614 in accordance with some embodiments. The fault detection operation 612 and fault remediation operation 614 are implemented using one or more computing machines programmed with executable instructions to perform the following operations. For economy of disclosure, only three ML models $608_1$, $608_2$, and $608_3$ are shown. However, it will appreciated that a larger number of ML models may be used for fault detection and remediation. First, second, and third event and/or trace data $1002_1$, $1002_2$, and $1002_3$ are respectively provided to first, second, and third ML models $608_1$, $608_2$, and $608_3$, which produce corresponding respective classification labels and confidence (probability) scores (L1, C1), (L2, C2), and L2, C2) that are indicative of the presence or absence of fault conditions. As explained above, different ML models $608_1$, $608_2$, and $608_3$ can be trained on different aspects of the DCM 100 to identify different fault conditions.

A fault analysis operation 1004 receives the outputs of the multiple ML models $608_1$, $608_2$, and $608_3$, and uses a voting process to combine the predictions of the multiple ML models $608_1$, $608_2$, and $608_3$ to predict DCM performance, a voting process is used. More particularly, in response to one or more MDC events being classified as a fault by one or more of the ML models $608_1$, $608_2$, and $608_3$, the one or more ML models emit a set of one or more labels and associated confidence (probability) scores for each label. The fault analysis operation 1004 sorts the labels by the confidence (high to low) and the labels below a pre-configured confidence threshold are discarded. The fault analysis operation 1004 sends fault information for faults exceeding the threshold to the fault remediator 614.

In response to the received fault information, the fault remediator 614 access a non-transitory storage medium 1006 to retrieve one or more playbooks 1008 associated with each label. These playbooks represent a set of actions which will be orchestrated through either the application manager or environment manager. The fault remediator 614 uses playbook information to provide information to the orchestration manager 200 to adjust DCM 100 configuration in response to the detected fault(s).

Thus, a system and method are provided to observe and react to faults in DCM 100, including the infrastructure in which the application runs (e.g., Kubernetes clusters), the infrastructure the application depends upon (e.g., external database), and external systems affecting their configuration (e.g., Git). The system and method trains one or more machine learning models to represent how the application and its dependencies should behave. The system and method can react or raise alerts in response to the application deviating from normal expected behavior. These reactions can be utilized to cause an orchestration manager to remediate a fault, which can involve running a scriptable automated playbooks to remediate faults.

Computing Machine

Figure 11:
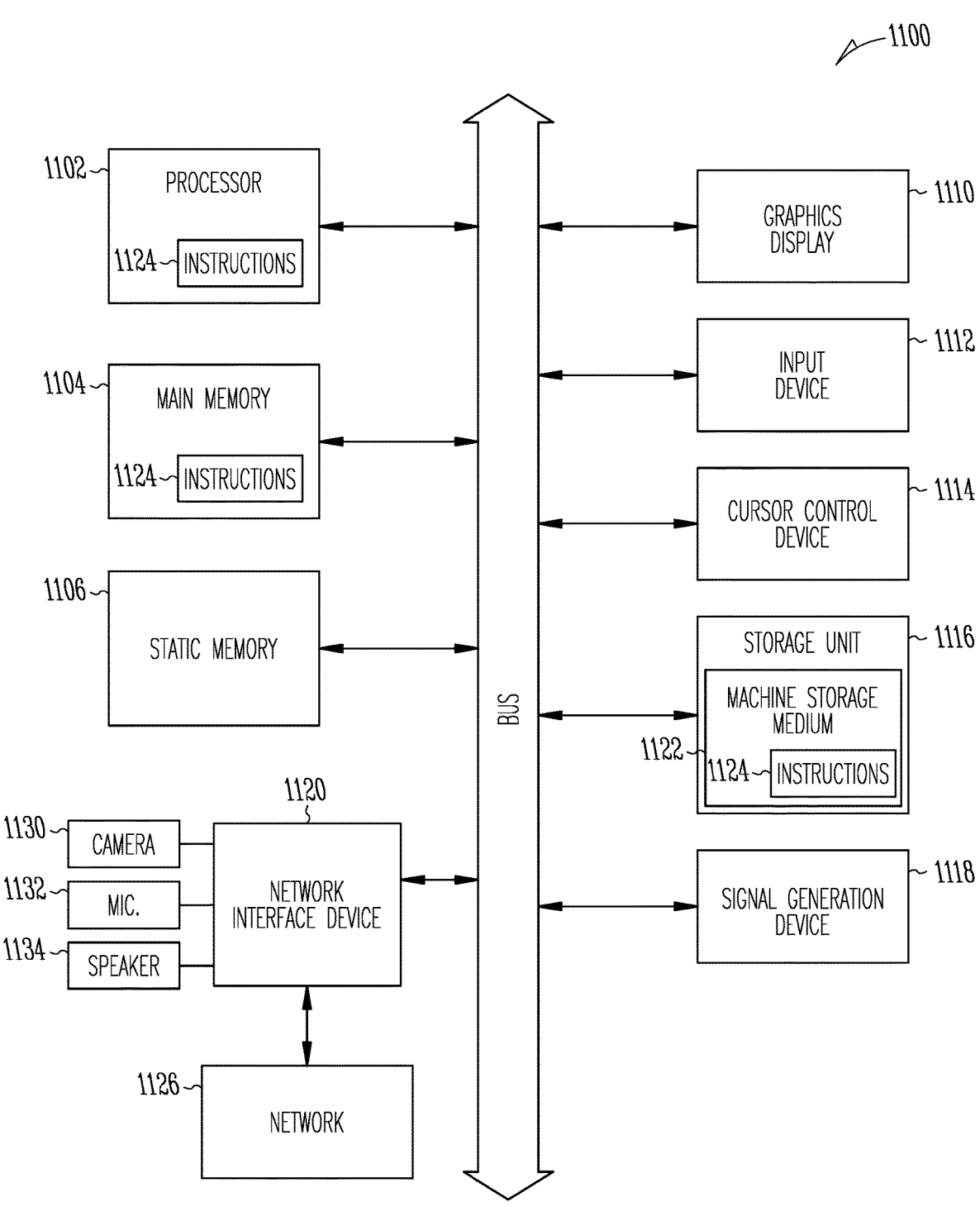
FIG. 11 illustrates components of a computing machine, according to some example embodiments

FIG. 11 illustrates components of a computing machine 1100, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 11 shows a diagrammatic representation of the computing machine 1100 in the example form of a computer device (e.g., a computer) and within which instructions 1124 (e.g., software, a program, an application, an applet, an app, or other executable code) for causing the machine 1100 to perform any one or more of the methodologies discussed herein may be executed, in whole or in part.

For example, the instructions 1124 may cause one or more instances of the machine 1100 to execute the flow diagrams of FIGS. 6-10. Moreover, one or more instances of the machine 1100 can be configured to implement the orchestration manager 200 and the cluster 102 and the computing machines 303, 403, 503. In one embodiment, the instructions 1124 can transform the general, non-programmed machine 1100 into a particular machine (e.g., specially configured machine) programmed to carry out the described and illustrated functions in the manner described.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The computing machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108.

The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT), or any other display capable of displaying graphics or video). The machine 1100 may also include an input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes a machine-storage medium 1122 (e.g., a tangible machine-readable storage medium) on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered as machine-readable media (e.g., tangible and non-transitory machine-readable media). The instructions 1124 may be transmitted or received over a network 1126 via the network interface device 1120.

In some example embodiments, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1104, 1106, and/or memory of the processor(s) 1102) and/or storage unit 816 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below. In this context, the machine-storage medium is non-transitory.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. A system for remediation of faults within a distributed computing machine (DCM) that includes a user interface application component that runs on a device and a distributed computing environment that includes computing resources and clusters, comprising:

an orchestration manager configured with executable instructions to configure the DCM by configuring the computing resources and clusters within the distributed computing environment;

one or more computing machines;

memory storage media operably coupled to the one or more computing machines, that stores instructions which, when executed by the one or more computing machines, cause the one or more computing machines to perform operations comprising:

receiving first event data, over a network that indicate occurrences of events within the DCM during operation of the DCM, and that include resource relationship information that indicate relationships between one or more of the distributed computing environment and a cluster within the DCM, the distributed computing environment and a workload within the DCM, or the distributed computing environment and a database within the DCM;

receiving second event data, over the network that includes trace information that provides metrics of activity within the DCM;

using the second event data with an RNN/LSTM algorithm to train a first machine learning (ML) model to use one or more of anomaly detection, predicting service response times, and understanding the temporal behavior of an application, to detect a first fault condition;

using the relationship information in the first event data to train a second ML model that uses a graph neural network, to capture dependencies and interactions, involving one or more of clusters, workloads, or databases, within the DCM to detect a second fault condition;

using the second event data with a clustering algorithm to train a third ML model to group similar trace information together to identify common usage patterns or performance bottlenecks, to detect a third fault condition;

detecting using the first, second, and third trained ML models, during operation of the DCM, whether there is an occurrence of one or more of the first, second, or third fault condition; and causing the orchestration manager to adjust configuration of the DCM based upon detection of an occurrence of one or more of the first, second, or third fault conditions.

2. The system of claim 1, wherein detecting using the respective first, second, and third trained ML models includes producing respective classification labels indicative of detected respective fault conditions and producing corresponding respective confidence scores.

3. The system of claim 2, wherein causing the orchestration manager to adjust configuration of the DCM includes causing, based upon one or more respective classification labels indicating detected faults and corresponding respective confidence scores that meet a confidence threshold.

4. The system of claim 2 further including:

causing the DCM to produce information indicative of DCM operation related to one or more fault conditions based upon one or more respective classification labels indicating detected fault conditions and corresponding respective confidence scores that meet a confidence threshold.

5. The system of claim 1 further including:

causing the DCM to produce information indicative of DMC operation related to one or more fault conditions based upon detection of an occurrence of one or more fault conditions.

6. The system of claim 1 further including:

sending to a user a recommendation indicating actions to remediate one or more fault conditions in response to detection of an occurrence of one or more fault conditions.

7. A system for remediation of faults within a distributed computing machine (DCM), that includes a user interface application component that runs on a device and a distributed computing environment that includes computing resources and one or more clusters, the DCM including, an application that includes a user interface component that includes program code that runs on a device to produce an application user interface and that includes a distributed component that includes program code that runs within the one or more clusters to implement distributed functions of the application, one or more compute resources that include program code that runs within a computing environment to support performance of the application, wherein the user interface component running on the device and the distributed component running within the one or more clusters are configured to communicate with one another over a network, and wherein the distributed component running within the cluster and the one or more compute resources running within the computing environment are configured to communicate with one another over the network, the system for remediation of faults within the DCM comprising:

an orchestration manager configured with executable instructions to configure the DCM by configuring computing resources and clusters within the distributed computing environment;

one or more computing machines;

memory storage media operably coupled to the one or more computing machines, that stores instructions which, when executed by the one or more computing machines, cause the one or more computing machines to perform operations comprising:

receiving first event data, over a network that indicate occurrences of events within the DCM during operation of the DCM, and that include relationship information that indicate relationships between one or more of the distributed computing environment and a cluster within the DCM, the distributed computing environment and a workload within the DCM, or the distributed computing environment and a database within the DCM;

receiving second event data, over the network that includes trace information that provides metrics of activity within the DCM;

using the second event data with an RNN/LSTM algorithm to train a first machine learning (ML) model to use one or more of anomaly detection, predicting service response times, and understanding the temporal behavior of an application, to detect a first fault condition;

using the relationship information in the first event data to train a second ML model that uses a graph neural network, to capture dependencies and interactions, involving one or more of clusters, workloads, or databases, within the DCM to detect a second fault condition;

using the second event data with a clustering algorithm to train a third ML model to group similar trace information together to identify common usage patterns or performance bottlenecks, to detect a third fault condition;

detecting using the first, second, and third trained ML models during operation of the DCM, whether there is an occurrence of the first, second, or third fault condition; and causing the orchestration manager to adjust configuration of the DCM based upon detection of an occurrence of one or more of the first, second, or third fault conditions.

8. The system of claim 7, wherein receiving the first event data and the second event data over the network during operation of the DCM includes receiving the first event data and the second event data over the network from the distributed component of the application that runs within the cluster to implement distributed functions of the application.

9. The system of claim 8, wherein receiving the first event data and the second event data over the network during operation of the DCM includes receiving the first event data and the second event data over the network from the user interface component of the application that runs on the device to produce an application user interface.

10. The system of claim 7, wherein the trace information includes one or more of processor usage level, memory usage level, or network activity within the cluster.

11. The system of claim 7 wherein detecting using the first trained ML model includes producing a first classification label to indicate detection of a first fault condition and producing a corresponding first confidence score;

wherein detecting using the second trained ML model includes producing a second classification label to indicate detection of a second fault condition and producing a corresponding second confidence score; and wherein detecting using the third trained ML model includes producing a third classification label to indicate detection of a third fault condition and producing a corresponding third confidence score.

12. The system of claim 11, wherein causing the orchestration manager to adjust configuration of the DCM based upon one or more of the first classification label indicating the first fault condition and the first confidence score meeting a threshold, the second classification label indicating the second fault condition and the second confidence score meeting the threshold, and the third classification label indicating the third fault condition and the third confidence score meeting the threshold.

13. The system of claim 7 further including:

causing the DMC to produce information indicative of DMC operation related to one or more fault conditions based upon detection of an occurrence of one or more fault conditions.

14. The system of claim 7 further including:

sending to a user a recommendation indicating actions to remediate one or more fault conditions based upon an occurrence of the one or more fault conditions.

15. A method for remediation of faults within a distributed computing machine (DCM) that includes a user interface application component that runs on a device and a distributed computing environment that includes computing resources and clusters, the method comprising:

using an orchestration manager configured with executable instructions to configure the DCM by configuring computing resources and clusters within the distributed computing environment;

receiving first event data, over a network that indicate occurrences of events within the DCM during operation of the DCM, and that include relationship information that indicate relationships between one or more of the distributed computing environment and a cluster within the DCM, the distributed computing environment and a workload within the DCM, or the distributed computing environment and a database within the DCM;

receiving second event data, over the network that includes trace information that provides metrics of activity within the DCM;

using the second event data with an RNN/LSTM algorithm to train a first machine learning (ML) model to use one or more of anomaly detection, predicting service response times, and understanding the temporal behavior of an application, to detect a first fault condition;

using the relationship information in the first event data to train a second ML model that uses a graph neural network, to capture dependencies and interactions, involving one or more of clusters, workloads, or databases, within the DCM to detect a second fault condition;

using the second event data with a clustering algorithm to train a third ML model to group similar trace information together to identify common usage patterns or performance bottlenecks, to detect a third fault condition;

detecting using the first, second, and third trained ML models, during operation of the DCM, whether there is an occurrence of one or more of the first, second, or third fault condition; and causing the orchestration manager to adjust configuration of the DCM based upon detection of an occurrence of one or more of the first, second, or third fault conditions.

16. A system for remediation of faults within a distributed computing machine (DCM) that includes a user interface application component that runs on a device and a distributed computing environment that includes computing resources and clusters, comprising:

an orchestration manager configured with executable instructions to configure the DCM by configuring the computing resources and clusters within the distributed computing environment;

one or more computing machines;

memory storage media operably coupled to the one or more computing machines, that stores instructions which, when executed by the one or more computing machines, cause the one or more computing machines to perform operations comprising:

receiving first event data, over a network that indicate occurrences of events within the DCM during operation of the DCM, and that include relationship information that indicate relationships between one or more of the distributed computing environment and a cluster within the DCM, the distributed computing environment and a workload within the DCM, or the distributed computing environment and a database within the DCM;

receiving second event data, over the network that includes trace information that provides metrics of activity within the DCM;

using the trace information in the second event data to train a first machine learning (ML) model to use one or more of anomaly detection, predicting service response times, and understanding the temporal behavior of an application, to detect a first fault condition;

using the relationship information in the first event data to train a second ML model to capture dependencies and interactions, involving one or more of clusters, workloads, or databases within the DCM, to detect a second fault condition;

using the trace information in the second event data to train a third ML model to group similar trace information together to identify common usage patterns or performance bottlenecks, to detect a third fault condition;

detecting using the first, second, and third trained ML models, during operation of the DCM, whether there is an occurrence of one or more of the first, second, or third fault condition; and causing the orchestration manager to adjust configuration of the DCM based upon detection of an occurrence of one or more of the first, second, or third fault conditions.

* * * * *